United States Patent
Steele et al.

(10) Patent No.: US 6,804,785 B2
(45) Date of Patent: Oct. 12, 2004

(54) METHOD AND SYSTEM FOR HANDLING PRODUCTION PROBLEMS IN AN EXTENDED ENTERPRISE ENVIRONMENT

(75) Inventors: Benjamin J. Steele, Newburgh, NY (US); Cecil Charles Dishman, Raleigh, NC (US); Robert M. Dunn, Hyde Park, NY (US); Kenneth A. Scea, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 09/742,477

(22) Filed: Dec. 20, 2000

(65) Prior Publication Data

US 2002/0184524 A1 Dec. 5, 2002

(51) Int. Cl.[7] .............................................. G06F 17/00
(52) U.S. Cl. ........................ 713/200; 713/176; 713/178
(58) Field of Search ................................ 713/176–181, 713/200–202

(56) References Cited

U.S. PATENT DOCUMENTS 6,721,746 B2 * 4/2004 Zulpa et al. ................. 713/201
6,732,181 B2 * 5/2004 Lim et al. .................... 713/200
6,735,694 B1 * 5/2004 Berstis et al. ................ 713/178

OTHER PUBLICATIONS

Snow et al., The challenge of accurate software project status reporting: a two–stage model incorporating status errors and reporting bias, Engineering Management, IEEE Transactions on, vol. 49, Issue 4, Nov. 2002, pp. 491–504.*
Bortoluzzi et al., A clinical report management system based upon the DICOM structured report standard, Computer–Based Medical Systems, 2003, Proceedings, 16th IEEE Symposium, Jun. 26–27, 2003, pp. 183–188.*
Schubert, Robust report level cluster–to–track fusion, Information Fusion, 2002, Proceedings of the Fifth International Conference on, vol. 2, pp. 913–918.*
12Technologies, Inc. "TradeMatrix Plan Solution" Sep. 2000.

* cited by examiner

*Primary Examiner*—David Jung
(74) *Attorney, Agent, or Firm*—Mark A. Ehrlich; Cantor Colburn LLP (57) ABSTRACT

An exemplary embodiment of the invention relates to a computer-based method and system for identifying and resolving manufacturing conflicts across an extended enterprise via a network environment. The system includes a manufacturing enterprise system comprising a host system operating a web server, an applications server, and a database manager; a data storage device in communication with the host system, and at least one terminal for accessing the host system. The manufacturing enterprise system runs on a network that is coupled to the Internet and is accessible to a supplier enterprise system identified with proper permissions. The applications server executes a set of programs for managing the manufacturing enterprise system, including the problem reporting and resolution application of the present invention. Problems associated with the components or assemblies for a manufactured product including defective materials are inputted into the manufacturing enterprise system via the problem reporting and resolution application where analysis and corrective action planning are performed on the inputs.

51 Claims, 6 Drawing Sheets

METHOD AND SYSTEM FOR HANDLING PRODUCTION PROBLEMS IN AN EXTENDED ENTERPRISE ENVIRONMENT

BACKGROUND

This invention relates generally to an electronic problem reporting and resolution process, and more particularly, this invention relates to a method and system for reporting and resolving manufacturing conflicts across an extended enterprise via a network environment.

With the advent of the Internet and related technologies, complex networking systems have evolved that enable distant trading partners operating disparate computer systems to interact with one another. The Internet provides a ubiquitous message routing architecture that supports reliable inter-business connectivity around the world, based on common communication protocols and common standards for system interoperability. Further, the Internet and related intranet and extranet technologies offer a relatively low cost of entry, making them practical for use by large and small businesses alike. Web-based security issues have been minimized through the use of intranets that connect a business' internal processes to the applications and data they need and extranets that connect external processes to the applications and data they need. Firewalls or security devices are added to protect against unauthorized access to the internal network and to isolate unauthorized Internet access from the extranet. With this new technology in place, existing trading barriers between trading partners can be removed, allowing for a synchronized flow of information.

A recent trend in electronics manufacturing involves contracting out some or all of the manufacturing of a company's products to third party manufacturers which then build these products according to specification. This arrangement, known as outsourcing, results where the original manufacturer (called an Original Equipment Manufacturer, or OEM) buys assemblies in bulk from third-party contract manufacturers and then customizes them for a particular application. It then markets and sells the customized equipment under its own name. By outsourcing the manufacturing and assembly of these goods, established OEMs are able to focus on other business areas such as new product development and customer relationship management. Additionally, as product designs and components are becoming increasingly complex and frequently updated, a contract manufacturer with specialized skills may be better equipped to accommodate the changing technology. By outsourcing to meet peak demands, an OEM may be able to avoid having to build new facilities and/or hire new people.

An OEM who is outsourcing the manufacturing of its products needs to be able to collaborate with its contract manufacturers and suppliers before, during, and after the manufacturing cycle in order to achieve maximum efficiency of the production process. One area of collaboration is problem reporting and resolution. When defects in components or assemblies are discovered during any phase of a manufacturing cycle, there needs to be a system in place for notifying, tracking and correcting these defects as soon as possible. This is no easy task in an outsourcing environment where manufacturing processes take place virtually anywhere around the globe, often by multiple manufacturing enterprises for a given OEM. Older legacy systems currently used for problem reporting and analysis are no longer adequate in today's global economy as its' proprietary software and non-integratable hardware was designed for internal operations only. As more and more enterprises are choosing to outsource their manufacturing processes and take advantage of newly-developed networking technologies, there is a need to expand and refine the existing problem reporting and resolution processes in order to accommodate a secure, collaborative network environment.

BRIEF SUMMARY

An exemplary embodiment of the invention relates to a computer-based method and system for reporting and resolving manufacturing conflicts across an extended enterprise via a network environment. The system includes a manufacturing enterprise system comprising a host system operating a web server, an applications server, and a database manager; a data storage device in communication with the host system, and at least one terminal for accessing the host system. The manufacturing enterprise system runs on a network that is coupled to the Internet and is accessible to an outside enterprise or trading partner identified with having proper access permissions. The applications server executes a set of programs for managing the manufacturing enterprise system, including the problem reporting and resolution application of the present invention. Problems associated with the components, assemblies, or processes for a manufactured product including defective materials are inputted into the manufacturing enterprise system via the problem reporting and resolution application where analysis and corrective action measures are performed on the inputs.

BRIEF DESCRIPTION OF THE DRAWINGS

Referring now to the drawings wherein like elements are numbered alike in the several FIGURES:

FIG. 3 illustrates an exemplary problem reporting and resolution screen window for generating a new problem document;

DETAILED DESCRIPTION

The problem reporting and resolution application is a tool used for facilitating the problem reporting and resolution processes in an extended enterprise environment. It provides a centralized storage system in which problem log documents can be created, edited, viewed and terminated by a variety of users inside and outside of an organization on a tiered-access basis. It further allows outsiders of the organization to submit comments and view a limited portion of information in the problem log documents via a secure network connection. System administrators for the organization establish and maintain the access permissions and set parameters for users of the problem reporting and resolution tool in keeping with the objectives of the organization. Specified users are tasked with the duty of identifying and implementing corrective actions to be taken in response to the data entered in the problem logs.

Figure 1:
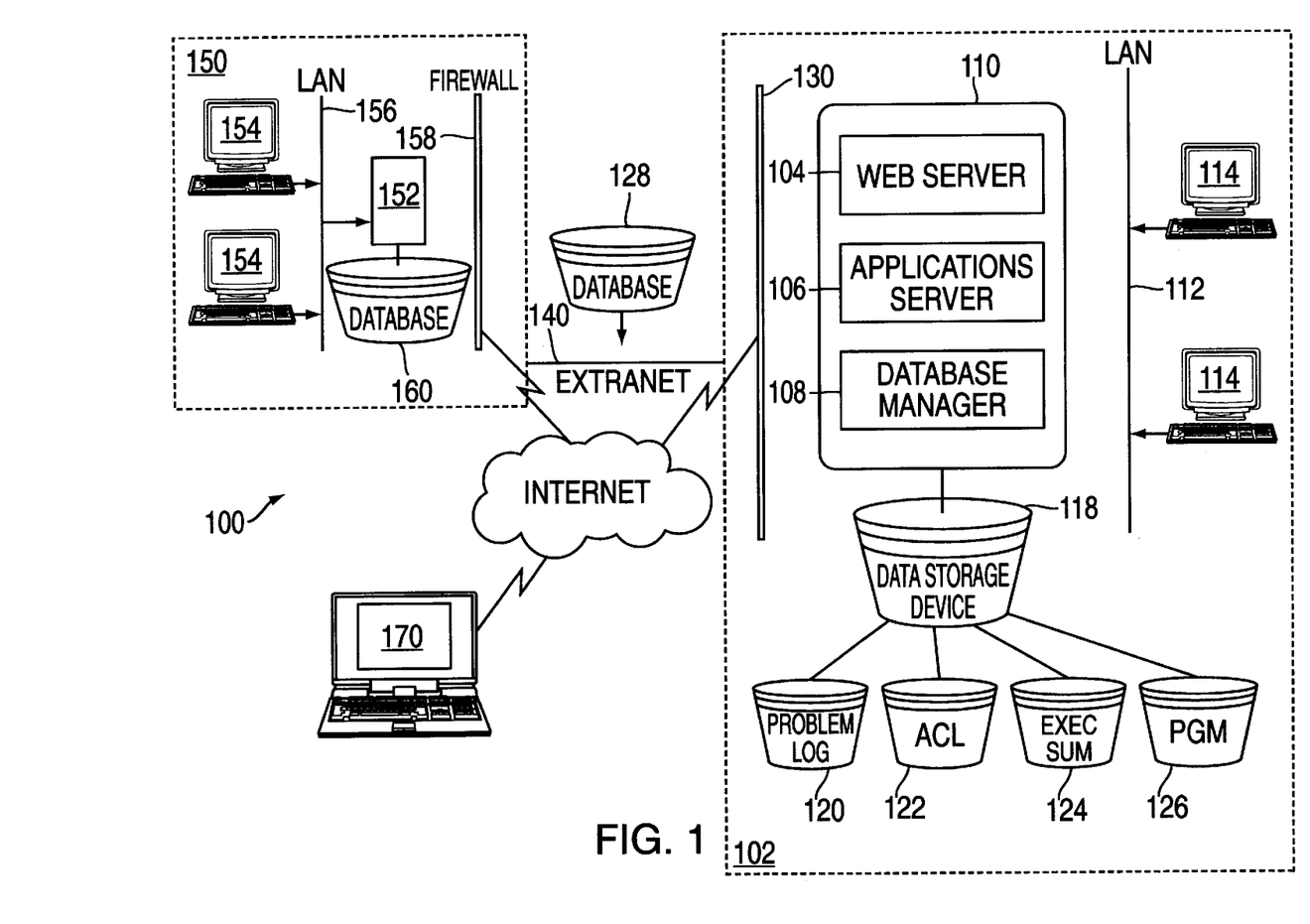
FIG. 1 is a block diagram of a portion of the system that includes a plurality of workstations and servers on which the problem reporting and resolution application is implemented.

In an exemplary embodiment, the problem reporting and resolution application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes an organization 102 comprising a web server 104, an applications server 106, and a database server 108 that are located on a host system 110 and connected through a network 112 to workstations 114. The term "organization" refers to the system implementing the problem reporting and resolution application. Network 112 may comprise a LAN, a WAN, or other network configuration known in the art. Further, network 112 may include wireless connections, radio-based communications, telephony-based communications, and other network-based communications. For purposes of illustration, however, network 112 is a LAN. A firewall 130 limits access to organization 102 to those users outside of organization 102 who possess proper access permissions. Firewall 130 may comprise a gateway router, proxy server or a combination of similar hardware/software devices readily known by those skilled in the art.

Host system 110 is running suitable web server software designed to accommodate various forms of communications and which allows information in data storage device 118 to be published on a web site. For purposes of illustration, host system 110 is running Lotus Domino™ as its server software. Applications server 106 executes the problem reporting and resolution tool, among other applications utilized by organization 102. Applications server 106 is also running a groupware application such as Lotus Notes™ which allows remote users to access information through its replication capabilities, provides e-mail services, and supports a secure extranet architecture.

Data storage device 118 resides within intranet 112 and may comprise any form of mass storage device configured to read and write database type data maintained in a file store (e.g., a magnetic disk data storage device). Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via database server 108.

Data storage device 118 provides a repository for databases including a problem log 120, access control lists 122, executive summaries data 124, public group manager data 126, and any other information desired by organization 102 for use by the problem reporting and resolution tool. These features are further described herein.

System 150 comprises a web server 152 that connects workstations 154 to an intranet 156 and to the Internet. Firewall 158 provides security and protection against unauthorized access to internal network information from outside sources. Each of workstations 154 may access web server 152 via internal web browsers (not shown) located on workstations 154. A data storage device 160 is coupled to server 152. A replica 128 of the problem log database 128 from data storage device 118 is accessible to system 150 via extranet 140. System 150 is typically an existing supplier or contract manufacturer of organization 102. The terms 'supplier' or 'contract manufacturer' and 'trading partner' are used interchangeably throughout this description. Remote workstation 170 is coupled to organization 102 via a web browser (not shown) and modem (not shown) for communicating with organization 102.

As described above, access to the databases in data storage device 118 is determined by system administrators of organization 102. Access levels can be defined by six 'user types' as follows:

Divisional Users. Divisional users are typically engineers and developers of organization 102. Divisions of organization 102 are classified or sorted according to the product being manufactured. For example, one division may be dedicated to manufacturing/assembling personal computers. A second division might be responsible for the production of mainframe computers. A third division might involve storage devices. Divisional users may create, update, and transfer documents in problem log database 120 to other authorized users, but are limited to modifying only those documents relating to their division.

Suppliers/Contract Manufacturers. These users are external to the organization but have a need to access certain information contained in problem log database 120. These users are restricted to viewing through the Internet a limited segment of information in problem log database 120 to ensure the overall confidentiality of the documents contained therein. Trading partners at system 150 can input comments or attachments through replicated database 128 and submit them via extranet 140 to the problem log database 120.

Executive Readers. These users are typically high level executives of organization 102 with 'view only' access to problem log database 120. Access is restricted to general information and executive summary data for problem documents and is used for informational purposes.

Divisional Administrators. Divisional administrators determine the access requirements and maintain the divisional setup documents for a given division. They also provide user support as necessary.

System Administrators. These users are similar to the divisional administrators except that they determine access requirements for all users of the database regardless of division. They also maintain database setup documents and provide user support and are described in further detail in FIG. 5.

I/T Support Staff. I/T Support Staff maintain the database architecture, address server performance and Internet access issues. These users have the highest level of access authority to address network system problems.

Access control lists store the names of authorized users of the databases stored in data storage device 118 and each user is assigned an access level by an administrator of organization 102. Only administrators can add, modify or delete authorized users in access control list database 122.

The problem reporting and resolution tool allows an organization to classify system users in accordance with its own business rules and is not limited to the six user categories defined above. A user may also be classified by the 'commodity' with which he/she works rather than by (or in addition to) the 'product' and 'division' classifications described above. For example, organization 102 may assign a representative or engineer to each commodity it is associated with regardless of which product it relates to. Examples of commodities in an electronics enterprise might include monitors, central processing units, cables, connectors, and power supplies. As may be seen, certain commodities may overlap between divisions. For example, a commodity such as 'power supplies' may span division one's personal computers as well as division two's mainframes. The significance of this overlapping will become apparent further herein.

Figure 2:
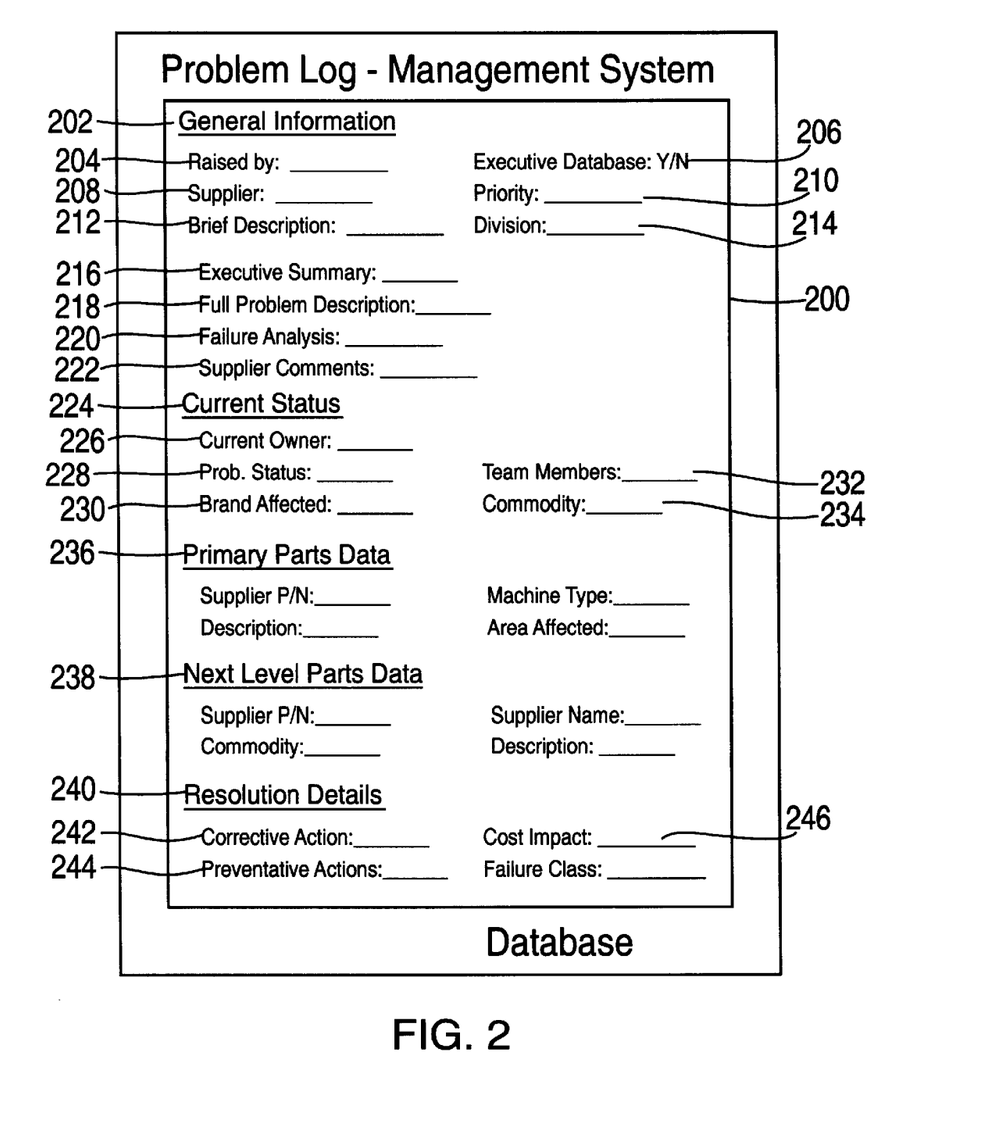
FIG. 2 illustrates an exemplary sample problem log document as seen by an authorized user of the problem reporting and resolution tool.

For each commodity, there is an assigned supplier quality engineer (SQE) who is responsible for overseeing the production of items involving the particular commodity. As the commodity may span more than one division, the SQE who is assigned to the power supply commodity group becomes responsible for each division that deals with power supplies. The problem reporting and resolution tool allows an SQE to be notified when a problem occurs that relates to a particular commodity. The SQE may also obtain a commodity view of a particular problem, as well as divisional views. When a problem is discovered, it is usually an SQE that initiates the problem reporting and resolution application in the system. FIG. 2 illustrates a sample problem log document 200 provided by the problem reporting and resolution tool.

The first category of information, or "General Information" 202 displays data entered by a divisional user of organization 102 during the initiation of a new problem document in accordance with the access rights provided by a divisional administrator. This category also displays information entered by divisional users when existing problem documents are updated, and/or transferred to other authorized users. "Raised by" 204 field indicates the name of the person who is reporting the problem. In the event a user does not enter a name in field 204, a default mechanism provided by the problem reporting and resolution tool automatically enters the name of the user assigned to the workstation through which the report was generated. The "Executive Database" 206 field allows higher level management the ability to keep abreast of problems occurring within their departments through an executive summary document stored in executive summary database 124. The name of the trading partner at system 150 that is involved with the problem or defect is shown in the "Supplier" 208 field. The problem reporting and resolution tool allows a user at organization 102 to prioritize the problem according to predefined standards using the "Priority" 210 field. When a high priority is designated, the problem reporting and resolution tool sends instant notification to necessary parties. The priority parameters may be determined by an administrator via the problem reporting and resolution access permissions screen window 400 of FIG. 4. Once a priority is designated, it can be viewed at field 210 of FIG. 2 and also generally in FIG. 4. When creating a new problem report, the user at organization 102 enters a brief description of the problem which appears in the "Brief Description" 212 field, followed by the division that the person named in "Raised by" 204 field is attached to in the "Division" field 214. The "Executive Summary" 216 field is used for providing general information regarding the problem in summary form to the appropriate executive management or council involved. By contrast, the "Full Problem Description" 218 field is used for providing detailed specifics regarding the problem for use by other division users and authorized personnel. Finally, the "Failure Analysis" 220 field identifies the nature of the defect as determined by the user. For example, a user may dissect a suspect component via x-ray machinery and provide specific information regarding the defect. Additionally, the problem reporting and resolution tool enables a user at either organization 102 or system 150 to attach graphical or pictorial images of the defect to the problem report if desired by converting the image to a JPEG format or other similar methods commonly known to those skilled in the art.

The "Supplier Comments" 222 field provides information obtained from a trading partner at system 150 via a secure network connection such as extranet 140. A trading partner may access a replicated version of the problem log database to a limited degree via extranet 140 and submit additional information pertaining to the defect reported. This access is granted by a system administrator as described above utilizing the access permissions parameters specified in the tool. When authorizing access to a trading partner, the administrator adds the trading partner to the ACL database 122, along with the access level granted. The trading partner is given a user ID and a password by a system administrator and accesses a replicated problem log database whereby he/she enters information into the "Supplier Comments" 222 field and selects "Submit" (not shown). When firewall replication occurs at firewall 140, the information is transferred to the problem log database of data storage device 118 and is available for viewing.

The next category "Current Status" 224 is controlled by a system administrator of organization 102 who then provides one or more divisional administrators limited access to edit items as needed. This category may then be utilized by authorized divisional users as allowed by a divisional administrator in order to edit and update an existing problem report. The user indicates who the problem was transferred to if applicable, by the "Current Owner" 226 field, followed by a status update via the "Prob. Status" 228 field. Other information that may be required includes a product or item brand 230 affected by the problem, team members 232 who are or should be involved with the problem, and the actual commodity 234 affected by the problem. Team members 232 may need to become authorized by an administrator and added to ACL database 122 if they are not already included at the time this information is entered. Team members 232 include any users who are affected by the defect. For example, a group of users in a first division are involved with a circuit board for a PC. It is discovered that the circuit board is defective and that overall production of the PC will be adversely affected. The engineers involved with the central processors for the PC will soon be affected as well; therefore, as team members they will need to be informed of the problem. This is accomplished via the "Team Members" 232 field. A similar situation may occur involving a particular commodity that translates across division lines. Engineers affected by the defect or problem may span several divisions not expressly provided for by the original problem report. For example, a defect of a component provided by a supplier was discovered in a first division and it became known that this component was scheduled to be used by other divisions. The divisional user reporting this problem may not be aware of the other divisions' intended use. By documenting this problem in commodity field 234, a commodity engineer SQE responsible for this component would be alerted via the problem reporting and resolution tool and would then notify other involved divisions.

Another category provided in the problem log is the "Primary Parts Data" 236 section. The I/T Support Staff of organization 102 is responsible for the maintenance of this section as well as the last two sections, "Next Level Parts Data" 238 and "Resolution Details" 240 respectively. The "Primary Parts Data" 236 and "Next Level Parts Data" 238 sections allow a user to specifically identify the nature, source and specifics of the reported problem including the supplier part numbers involved, machine types, areas affected by the problem, etc. This information further sets out the scope of the problem as it affects the overall operation of organization 102's manufacturing processes enabling organization 102 to obtain a large scale picture of the problem and its perceived effects.

The last category, "Resolution Details" 240 specifies what corrective action 242 will be taken to alleviate the problem, including preventative measures 244, and cost impact 246. This information may provide insight to other divisions or users with respect to the handling of such matters and may provide guidance to management personnel in similar situations.

Much of the information contained in the problem log document 200 is generated via the "Create New Document" tool of the problem reporting and resolution application shown in FIG. 3 and its corresponding edit and transfer features. These features are further described herein. A user of organization 102 creates a new problem document by selecting "New Problem" 302 on problem reporting and resolution window 300. A new problem document screen will appear as shown in window 300. As described in FIG. 2, categories of information are requested to be provided by the user via the problem reporting and resolution tool. Those fields with "astericks" (*) are required entries. As shown generally in FIG. 3, many fields provide drop down capabilities for ease in entering information. Certain defaults can be designated by an administrator where appropriate. For example, where a user fails to provide the name of his/her manager in field 304, a default is set to automatically enter the manager assigned to that user. Also, where a user fails to enter the current status of the problem in the "Status" field 306, the system is configured to automatically enter the status as "open", indicating that the problem is ongoing and is yet to be resolved. An administrator can alter the types of fields shown in FIG. 3 as appropriate. Once the document is completed, the user saves it by clicking on the "Save" button 308 on window 300, and a tracking number for the document is automatically assigned by the Problem reporting and resolution tool (not shown).

Figure 4:
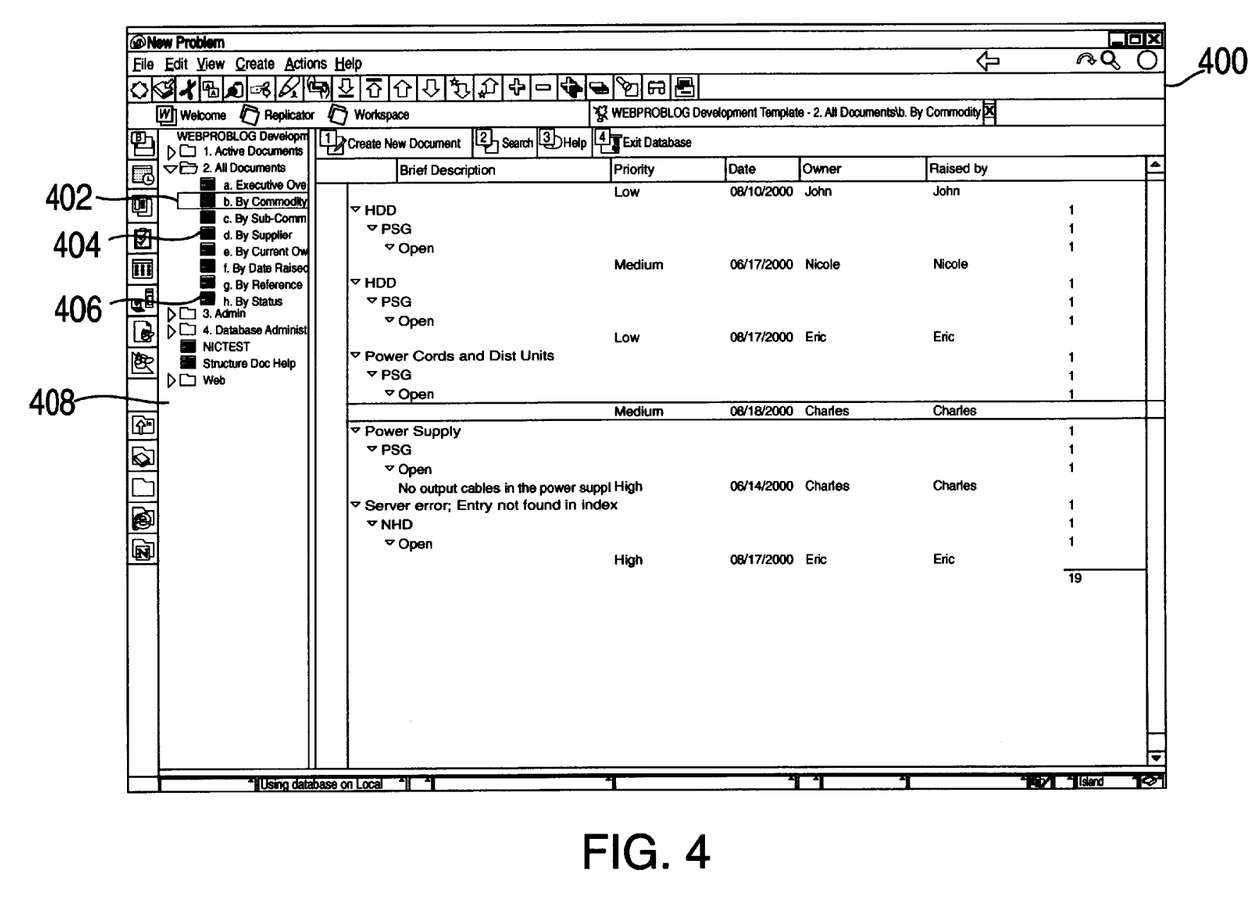
FIG. 4 illustrates an exemplary problem reporting and resolution screen window for updating an existing problem log document.

FIG. 4 illustrates how a user at organization 102 updates a current problem document. The system may be configured by an administrator such that a user can select a document via a variety of fields of information within the problem log database, such as by "Commodity" 402, "Supplier" 404, "Status" 406, etc. from menu 408. The user selects one of the fields from the choices listed on the document menu 408, and the update screen window 400 appears. Once the document is selected, it is presented to the user in edit mode, whereby all fields are available for update. The problem log database 120 tracks any changes made to the document by user name and date. Trading partners from system 150, on the other hand, may only update the supplier comment field 222 of FIG. 2. Once in the edit mode, the supplier can enter text comments into the rich text field and/or attach files via the browse and attach buttons (not shown). After the update has been made, the trading partner clicks on the "submit" button on the browser window (not shown) to send the data through the firewall to the problem document.

The transfer option is utilized where a user desires to transfer ownership of an existing problem document. This transfer may become necessary for a variety of reasons, such as, where the problem has been partially resolved with one division or group of team members but needs further corrective action from a second division or group of team members. This transfer of ownership is accomplished by selecting the "Transfer" button 310 on the toolbar of FIG. 3. The user will then be presented with a list of authorized users to select. Once completed, a note will be automatically sent by host system 110 to the new owner of the transfer (not shown).

Figure 5:
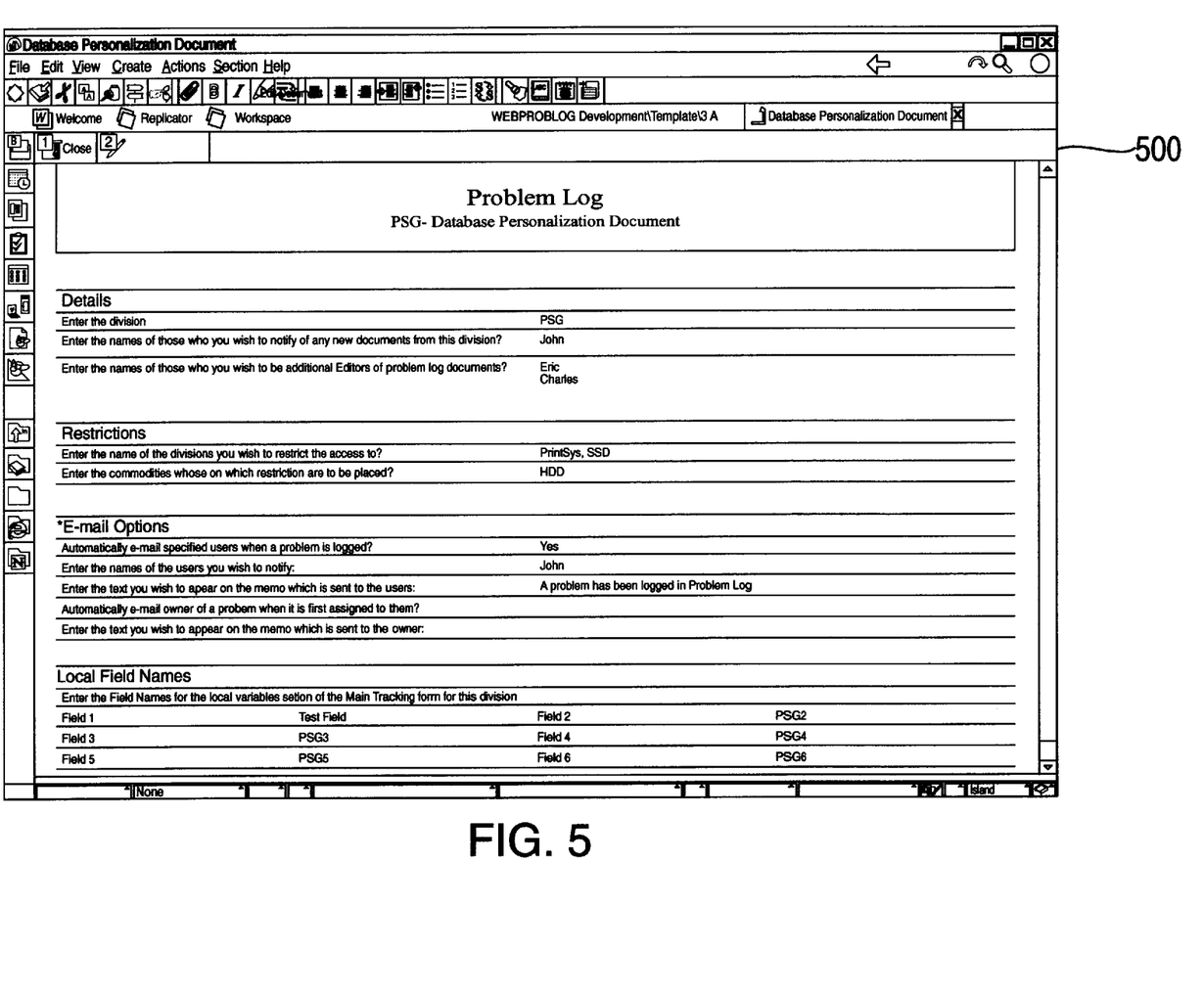
FIG. 5 illustrates an exemplary problem reporting and resolution screen window for setting up access permissions to the problem reporting and resolution tool.

Access for division administrators is controlled through groups in the "Public Group Manager" database 126 in data storage device 118. System administrators maintain this database and authorize and update these access rights. Divisional setup documents define specific parameters and fields that appear when viewed by divisional users. An example of a divisional setup document is illustrated in FIG. 5. Divisional documents are used to define which users are notified when a problem is originated, define which users have editor capability to documents within the division, restrict viewing access rights to specific divisions and commodities, and add divisional specific fields to the main problem document. An administrator logs on to the problem reporting and resolution tool and selects the Database Personalization Document item (not shown). The window 500 of FIG. 5 appears. The items that can be selected for determining access permissions are shown generally in window 500 and include designating who an e-mail should be automatically sent to upon a problem document being generated and under what specific circumstances notification should occur.

Figure 6:
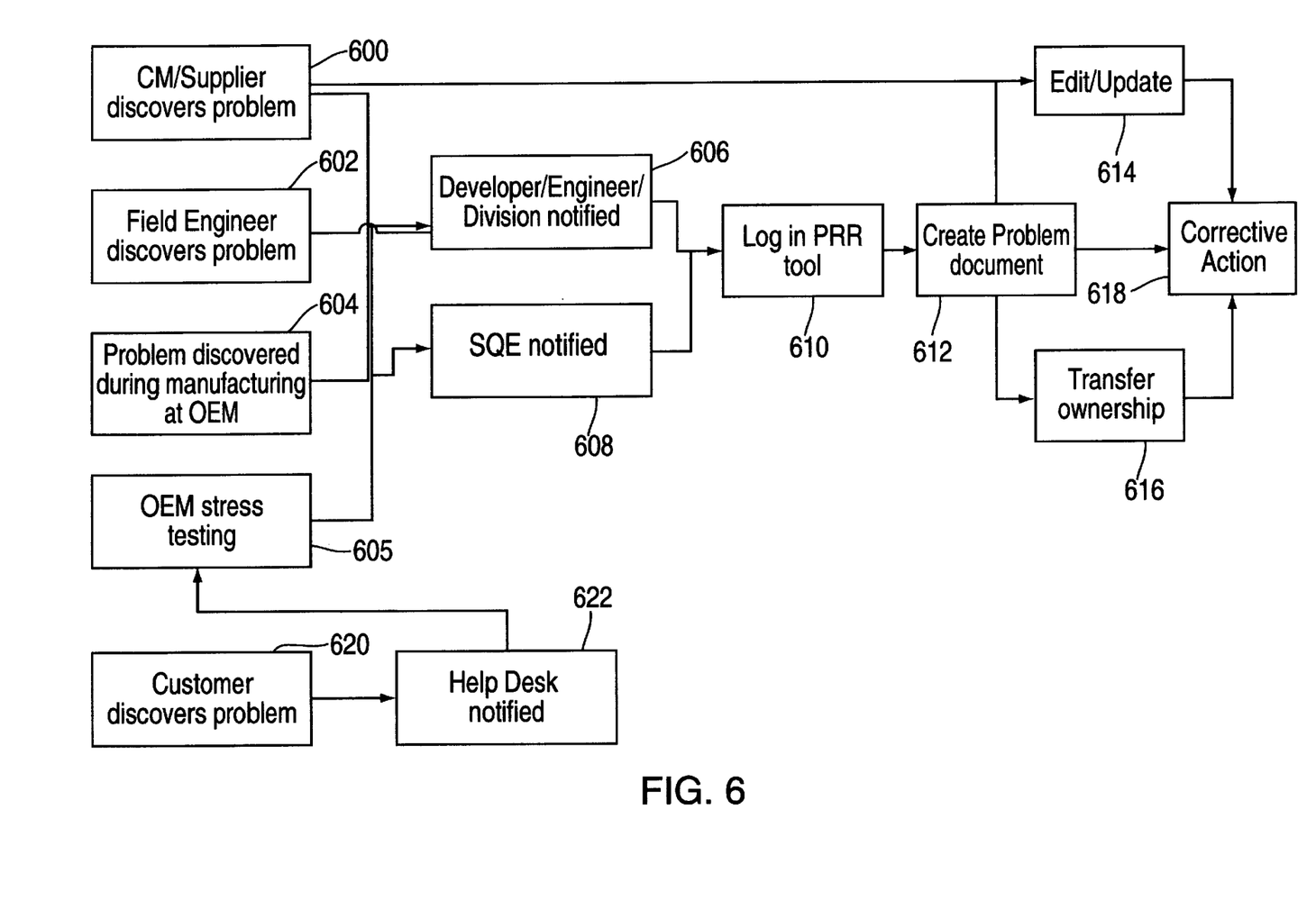
FIG. 6 is a flowchart illustrating how a problem is discovered, processed, and resolved via the problem reporting and resolution application.

As indicated above, problems can be discovered before, during or even after the manufacturing process. FIG. 6 illustrates the context in which a problem or defect may occur, and how the Problem reporting and resolution tool processes the problem once it is entered into the system. One way a problem may be discovered is by a contract manufacturer or supplier at step 600 during its manufacturing process. A supplier at system 150 may discover that one or more batches of its components scheduled to be delivered to organization 102 (or alternatively to a contract manufacturer on behalf of organization 102) is faulty or defective. Another way a problem may be discovered is by a field engineer of organization 102 who performs daily repairs and maintenance on the organization's products. A field engineer at step 602 may discover that he/she is replacing an unusually high volume of a particular component during scheduled maintenance visits to customer sites, creating concern about the component's integrity. Yet another way a problem may be discovered is by the organization's engineers either during its internal manufacturing at step 304 or during random stress testing conducted on site at step 605. In each of the above situations, either a developer for a particular division of organization 102 is notified at step 606 or a supplier quality engineer (SQE) of organization 102 is notified at step 608 who, in turn, accesses the problem reporting and resolution tool at 610 to document the problem. The developer or SQE generates a problem document in the problem log database 120 at step 612 and saves it in the system. Once created, the developer, SQE engineer, or other authorized user can edit or update the problem report as necessary at step 614, or may transfer ownership of the problem to other users at step 616. Additionally, once the report is saved in problem log database 120, a trading partner at system 150 with proper access can edit the report by providing comments in the supplier field 222 of FIG. 2. Specified users with access can then examine the report, identify the defect, and decide on what corrective actions should be taken at step 618.

Another way a problem can be discovered is through the organization's customer base at step 620. A customer detects a problem affecting a purchased or leased product and accesses organization 102's web site. The customer selects the help desk option at step 622 and reports the problem via the web. A service department or technical representative of organization 102 associated with the help desk receives the notice, and, if a pattern of similar defects have been reported, schedules a stress test or similar testing at step 605 in order to determine the nature of the defect. Flow then proceeds as described earlier in steps 606–618. The problem reporting and resolution tool enables users to systematically report, update and resolve problems occurring throughout the manufacturing process in near real time and without compromising confidential data through its secure extranet, tiered access controls, and user-friendly menu items. The tool is implemented by a web-enabled host system executing collaborative messaging software, e-mail applications, and database replicating tools that allow internal and remote users of an organization, as well as its external trading partners, to communicate and collaborate on business transactions.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating problem reporting and resolution functions in a communications network environment, comprising:

receiving a request from a first enterprise system to contact a web site maintained by a second enterprise system;

said second enterprise system authenticating a user ID and password of a user of said first enterprise system;

receiving a request to initiate an activity, said activity provided by said second enterprise system among a plurality of activity options;

said second enterprise system retrieving data from at least one database, said data corresponding to said activity selected; and transmitting said data to said first enterprise system;

wherein said second enterprise system includes a problem reporting and resolution application for executing said activity options.

2. The method of claim 1, further comprising:

replicating a database associated with said second enterprise system resulting from a request by said first enterprise to submit data into a supplier comment form, said request associated with a first of said activity options;

providing access to said database;

displaying said supplier comment form;

receiving response data from said first enterprise system, said response data provided in said supplier comment form;

storing said response data in said database; and associating said response data with an entity within said second enterprise system.

3. The method of claim 2, wherein said entity is a division.

4. The method of claim 2, wherein said entity is a commodity.

5. The method of claim 2, further comprising:

receiving an attached text file with said response data.

6. The method of claim 2, further comprising:

receiving a graphical image with said response data.

7. The method of claim 2, wherein said associating said response data with said entity includes: sending a notification to said entity; and making said response data available to said entity.

8. The method of claim 1, further comprising:

replicating a database associated with said second enterprise system resulting from a request by said first enterprise system to edit data in a supplier comment form, said request being associated with a second of said activity options;

providing access to said database;

displaying said supplier comment form;

receiving response data from said first enterprise system, said response data including changes to information contained in said supplier comment form;

storing said response data in said database; and associating said response data with an entity within said second enterprise system.

9. The method of claim 8, wherein said entity is a division.

10. The method of claim 8, wherein said entity is a commodity.

11. The method of claim 8, further comprising:

receiving an attached text file with said response data.

12. The method of claim 8, further comprising:

receiving a graphical image with said response data.

13. The method of claim 8, wherein said associating said response data with said entity includes:

sending a notification to said entity; and making said response data available to said entity.

14. The method of claim 1, further comprising:

replicating a database associated with said second enterprise system resulting from a request by said first enterprise system to view data in a supplier comment form; said associated with a third of said activity options; and providing access to said database, wherein said access is limited to viewing data relating to said first enterprise system.

15. The method of claim 1, wherein said communications network includes an extranet.

16. The method of claim 1, wherein said authenticating said user ID and said password is accomplished via a firewall.

17. The method of claim 1, wherein said user is a supplier.

18. The method of claim 1, wherein said user is a contract manufacturer.

19. The method of claim 1, wherein said user is a trading partner.

20. A method of implementing access to a plurality of network entities, for use in facilitating problem reporting and resolution functions in a communications network environment, the method comprising:

creating a database of divisional users, each of said divisional users assigned to a divisional administrator, wherein said divisional administrator is associated with a division on the network;

assigning access rights to said divisional users by said divisional administrator;

receiving a request to access one of said entities by one of said divisional users; and automatically verifying identity of said one of said divisional users against said database of division users.

21. The method of claim 20, further comprising:

creating a database of said divisional administrators, each of said divisional administrators assigned to a system administrator, wherein said system administrator is associated with a system;

assigning access rights to said divisional administrators by said system administrator; and receiving a request to access one of said entities by one of said divisional administrators; and automatically verifying identity of said one of said divisional administrators against said database of divisional administrators.

22. The method of claim 20, further comprising:

creating a database of commodity types, each of said commodity types corresponding to at least one division; and assigning an engineer to each of said commodity types.

23. The method of claim 20, further comprising:

creating a database of IT support staff, said IT support staff controlling access to said communications network environment.

24. A system for facilitating problem reporting and resolution functions in a communications network environment, comprising:

a host system including a web server, an applications server, and a database server;

a data storage device in communication with said host system;

problem reporting and resolution software application being executed by said host system;

a firewall in communication with said host system;

a workstation; and a computer network connecting the host system to the workstation; wherein information inputted into the workstation is transferred to the host system and made available to the problem reporting and resolution software application.

25. The system of claim 24, wherein said data storage device includes:

a problem log database;

an access control list database;

an executive summary database; and a public group manager database.

26. The system of claim 24, further comprising:

a remote device in communication with said host system.

27. The system of claim 26, wherein said communication is via the Internet.

28. The system of claim 26, wherein said communication is via an extranet.

29. A storage medium encoded with machine-readable computer program code for facilitating problem reporting and resolution functions in a communications network environment, the storage medium including instructions for causing an enterprise system to implement a method comprising:

receiving a request from a first enterprise system to contact a web site maintained by a second enterprise system;

said second enterprise system authenticating a user ID and password of a user of said first enterprise system;

receiving a request to initiate an activity, said activity provided by said second enterprise system among a plurality of activity options;

said second enterprise system retrieving data from at least one database, said data corresponding to said activity selected; and transmitting said data to said first enterprise system;

wherein said second enterprise system includes a problem reporting and resolution application for executing said activity options.

30. The storage medium of claim 29, further comprising instructions for causing a computer to implement:

replicating a database associated with said second enterprise system resulting from a request by said first enterprise to submit data into a supplier comment form, said request associated with a first of said activity options;

providing access to said database;

displaying said supplier comment form;

receiving response data from said first enterprise system, said response data provided in said supplier comment form;

storing said response data in said database; and associating said response data with an entity within said second enterprise system.

31. The storage medium of claim 30, wherein said entity is a division.

32. The storage medium of claim 30, wherein said entity is a commodity.

33. The storage medium of claim 30, further comprising instructions for causing a computer to implement:

receiving an attached text file with said response data.

34. The storage medium of claim 30, further comprising instructions for causing a computer to implement:

receiving a graphical image with said response data.

35. The storage medium of claim 30, wherein said associating said response data with said entity includes: sending a notification to said entity; and making said response data available to said entity.

36. The storage medium of claim 29, further comprising instructions for causing a computer to implement:

replicating a database associated with said second enterprise system resulting from a request by said first enterprise system to edit data in a supplier comment form, said request being associated with a second of said activity options;

providing access to said database;

displaying said supplier comment form;

receiving response data from said first enterprise system, said response data including changes to information contained in said supplier comment form;

storing said response data in said database; and associating said response data with an entity within said second enterprise system.

37. The storage medium of claim 36, wherein said entity is a division.

38. The storage medium of claim 36, wherein said entity is a commodity.

39. The storage medium of claim 36, further comprising instructions for causing a computer to implement:

receiving an attached text file with said response data.

40. The storage medium of claim 36, further comprising instructions for causing a computer to implement:

receiving a graphical image with said response data.

41. The storage medium of claim 36, wherein said associating said response data with said entity includes:

sending a notification to said entity; and making said response data available to said entity.

42. The storage medium of claim 29, further comprising instructions for causing a computer to implement:

replicating a database associated with said second enterprise system resulting from a request by said first enterprise system to view data in a supplier comment form; said associated with a third of said activity options; and providing access to said database, wherein said access is limited to viewing data relating to said first enterprise system.

43. The storage medium of claim 29, wherein said communications network includes an extranet.

44. The storage medium of claim 29, wherein said authenticating said user ID and said password is accomplished via a firewall.

45. The storage medium of claim 29, wherein said user is a supplier.

46. The storage medium of claim 29, wherein said user is a contract manufacturer.

47. The storage medium of claim 29, wherein said user is a trading partner.

48. A storage medium encoded with machine-readable computer program code for implementing access to a plurality of network entities, for use in facilitating problem reporting and resolution functions in a communications network environment, the storage medium including instructions for causing a computer to implement a method comprising:

creating a database of divisional users, each of said divisional users assigned to a divisional administrator, wherein said divisional administrator is associated with a division on the network;

assigning access rights to said divisional users by said divisional administrator;

receiving a request to access one of said entities by one of said divisional users; and automatically verifying identity of said one of said divisional users against said database of division users.

49. The storage medium of claim 48, further comprising instructions for causing a computer to implement:

creating a database of said divisional administrators, each of said divisional administrators assigned to a system administrator, wherein said system administrator is associated with a system;

assigning access rights to said divisional administrators by said system administrator; and receiving a request to access one of said entities by one of said divisional administrators; and automatically verifying identity of said one of said divisional administrators against said database of divisional administrators.

50. The storage medium of claim 48, further comprising instructions for causing a computer to implement:

creating a database of commodity types, each of said commodity types corresponding to at least one division; and assigning an engineer to each of said commodity types.

51. The storage medium of claim 48, further comprising instructions for causing a computer to implement:

creating a database of IT support staff, said IT support staff controlling access to said communications network environment.

* * * * *